United States Patent
Astrom et al.

(10) Patent No.: US 10,511,988 B2
(45) Date of Patent: Dec. 17, 2019

(54) RECEIVING PATH SCHEDULING IN A WIRELESS COMMUNICATION SYSTEM FOR A WIRELESS COMMUNICATION DEVICE HAVING MULTIPLE RECEIVING PATHS AND MULTIPLE SIMS

(71) Applicant: Telefonaktiebolaget LM Ericsson (publ), Stockholm (SE)

(72) Inventors: Magnus Astrom, Lund (SE); Joakim Axmon, Kavlinge (SE); Bengt Lindoff, Bjarred (SE)

(73) Assignee: TELEFONAKTIEBOLAGET LM ERICSSON (publ), Stockholm (SE)

(*) Notice: Subject to any disclaimer, the term of this patent is extended or adjusted under 35 U.S.C. 154(b) by 0 days.

(21) Appl. No.: 15/321,710

(22) PCT Filed: May 12, 2016

(86) PCT No.: PCT/EP2016/060707
§ 371 (c)(1),
(2) Date: Dec. 22, 2016

(87) PCT Pub. No.: WO2017/194128
PCT Pub. Date: Nov. 16, 2017

(65) Prior Publication Data
US 2019/0069193 A1    Feb. 28, 2019

(51) Int. Cl.
*H04W 28/02*    (2009.01)
*H04W 52/02*    (2009.01)

(52) U.S. Cl.
CPC ..... *H04W 28/0205* (2013.01); *H04W 52/028* (2013.01); *H04W 52/0258* (2013.01)

(58) Field of Classification Search
CPC ......... H04W 28/0205; H04W 52/0258; H04W 52/028
See application file for complete search history.

(56) References Cited

U.S. PATENT DOCUMENTS

| | | | |
|---|---|---|---|
| 2009/0323639 A1* | 12/2009 | Kim | H04W 36/0055 370/331 |
| 2012/0113935 A1* | 5/2012 | Lindoff | H04W 72/1278 370/329 |

(Continued)

FOREIGN PATENT DOCUMENTS

| | | |
|---|---|---|
| WO | 2015038237 A1 | 3/2015 |
| WO | 2015180129 A1 | 12/2015 |
| WO | 2015180779 A1 | 12/2015 |

OTHER PUBLICATIONS

PCT International Search Report, dated Jan. 12, 2017, in connection with International Application No. PCT/EP2016/060707, all pages.

(Continued)

*Primary Examiner* — Tejis Daya
(74) *Attorney, Agent, or Firm* — Leffler Intellectual Property Law, PLLC

(57) ABSTRACT

A wireless communication device and method therein for handling operating mode in a wireless communication system are disclosed. The wireless communication device comprises multiple receiving paths and at least two SIMs. A first SIM connection is in active mode towards a first network node, a second SIM connection is in idle mode and camping on a second network node. The wireless communication device is configured to determine a first time instant, a first time duration and a type of idle mode task to be performed by the second SIM connection and determine a number of receiving paths needed for the idle mode task to be performed by the second SIM connection. The wireless communication device is further configured to report at a second time instant prior to the first time instant, to the first network node a changed receiving capability of the first SIM connection. Then the wireless communication device is configured to allocate a first set of receiving paths to the first SIM connection and a second set of receiving paths to the second (Continued)

SIM connection to perform the idle mode task during the first time duration.

22 Claims, 4 Drawing Sheets

(56) References Cited

U.S. PATENT DOCUMENTS

| | | | |
|---|---|---|---|
| 2013/0324145 A1 | 12/2013 | Tabet et al. | |
| 2015/0208279 A1* | 7/2015 | Lindoff | H04W 28/08 370/235 |
| 2016/0149618 A1* | 5/2016 | Batchu | H04B 7/0404 455/553.1 |
| 2016/0249408 A1* | 8/2016 | Thiruvenkatachari | H04W 76/38 |
| 2017/0070877 A1* | 3/2017 | Shi | H04W 8/183 |
| 2017/0070940 A1* | 3/2017 | Handa | H04W 40/02 |
| 2017/0127217 A1* | 5/2017 | Miao | H04W 76/10 |
| 2017/0171902 A1* | 6/2017 | Tillman | H04W 28/18 |

OTHER PUBLICATIONS

PCT Written Opinion, dated Jan. 12, 2017, in connection with International Application No. PCT/EP2016/060707, all pages.

\* cited by examiner

RECEIVING PATH SCHEDULING IN A WIRELESS COMMUNICATION SYSTEM FOR A WIRELESS COMMUNICATION DEVICE HAVING MULTIPLE RECEIVING PATHS AND MULTIPLE SIMS

TECHNICAL FIELD

Embodiments herein relate to a wireless communication device and a method therein. In particular, they relate to handling operating modes in the wireless communication device which comprises multiple receiving paths and at least two Subscriber Identity Modules, SIMs.

BACKGROUND

Wireless communication devices may be referred to as mobile telephones, user equipments (UE), wireless terminals, mobile terminals, mobile stations, cellular telephones, smart phones, laptops, tablets and phablets, i.e. a combination of a smartphone and a tablet with wireless capability. Wireless communication devices are enabled to communicate or operate wirelessly in a wireless communication system comprising multiple networks or Heterogeneous Networks (HetNet) with access nodes or access points. The heterogeneous networks may comprise, e.g. a cellular communications network comprising Second I/Third Generation (2G/3G) network, such as Global System for Mobile Communications (GSM), Wideband Code Division Multiple Access (WCDMA) or High Speed Packet Access (HSPA) etc., 3G Long Term Evolution (LTE) network, Worldwide interoperability for Microwave Access (WiMAX) network, Wireless Local Area Network (WLAN) or WiFi etc. for proving different type of radio access technologies (RATs). A wireless communications network may cover a geographical area which is divided into cells or cover areas, wherein each cell is served by a network node, which may also be referred to as a serving network node, an access node, an access point or a base station, e.g. eNodeB (eNB) or NodeB.

The development of new generations of cellular systems simultaneously with upgrading existing generations allows for a wider range of accessible networks and RATs. In an environment where e.g., both LTE and HSPA co-exist, data rates for the two RATs are comparable. Furthermore, both LTE and HSPA allow for multi carrier signalling. In LTE this capability is denoted as Carrier Aggregation (CA), allowing for up to five LTE carriers to be aggregated, whereas in HSPA it is denoted as Multi Carrier (MC), allowing for up to eight HSPA carriers to be aggregated.

Further, specifications for the Evolved Packet System (EPS), also called a Fourth Generation (4G) network, have been completed within the $3^{rd}$ Generation Partnership Project (3GPP) and this work continues in the coming 3GPP releases, for example to specify a Fifth Generation (5G) network. This will provide more accessible networks and RATs.

An arising scenario today is multiple Subscriber Identity Modules (SIMs) devices, such as UEs may carry two or more SIMs from a single or multiple operators in the same device. Particularly in Asia this has become de facto standard, although it has not been standardized by the 3rd Generation Partnership Project (3GPP). On many markets it is hard to get operator approval and volumes for a mid-end device without the capability of supporting at minimum Dual SIM Dual Standby (DSDS). The capability of supporting DSDS allows a UE to camp on two cells simultaneously, or be connected to one cell and camp on another cell. In case both SIMs are from the same operator, the UE may occasionally camp on the same cell but with two different identities and associated paging occasions. In order to qualify for high-end device approval, it is generally required to support Dual SIM Dual Activity (DSDA), whereby the UE can be independently connected towards two cells simultaneously.

The popularity of DSDS/DSDA devices on Asian markets depends on several factors. One factor may be that operators have different price plans e.g. for data and voice, or may have different price plans depending on calling subscribers in same or other network. Other factors may be, e.g. different coverage by different operators, i.e. spotty coverage, or that a mobile phone number cannot move between operators. The trend is towards to support even more than two SIMs simultaneously, and UEs with support for three and four SIMs, Triple SIM, Triple Standby (TSTS) and Quad SIM Quad Standby (QSQS) have been announced by some UE vendors.

For DSDA UEs in active mode, it is required for the UE to use separate receivers for each connection, since it e.g. may use a Packet Switched (PS) service simultaneously for both SIMs, or may use PS service for one and a Circuit Switched (CS) service for the other. Therefore to support DSDS/DSDA, TSTS/QSQS and different RATs, the wireless communication devices usually comprise multiple receiving paths.

Moreover multi-antenna UEs have been introduced in LTE network. Although not explicitly stated, requirements that were defined for Evolved Universal Terrestrial Radio Access (E-UTRA) in the 3GPP LTE specification Release 8 were impossible to pass without two antennas. In parallel, UEs with dual antennas were introduced also in the previous generation of cellular systems, such as in WCDMA.

3GPP's Radio Access Network Working Group 4 (RAN 4) is responsible for defining the requirements for transmission and reception parameters, channel demodulation and radio resource management. Although the functionality of up to eight Multi-input Multi-output (MIMO) streams has been specified in 3GPP RAN 1 since Release 10, it is not until the ongoing Release 13 that the work on the requirements specification was instigated for up to 4 MIMO streams.

Four downlink receive antennas (DL 4 RX) increases the spatial diversity allowing for more parallel streams to be transmitted when conditions allow, or for the UE to being able to cancel out interferers while receiving data allowing for higher modulation orders or code rates although not necessarily using more parallel layers. All in all this will result in significantly higher data rates compared to a standard DL 2 RX UE. Future UEs may very well be equipped with even more antennas, in particular considering the increased carrier frequencies that are being introduced in future standards, allowing for smaller but more antennas on the same space.

MIMO allows multiple layers to be transmitted in parallel streams over the same physical time-frequency resource. The number of parallel streams are, however, limited to the lesser number of the number of transmit antennas and the number of receive antennas. Quite often, in practice the number of streams is even less than that. The actual value depending on several factors such as radio propagation environment, as well as the antenna design of both the eNB and the UE.

For improving the performance of wireless communication devices with multiple SIMs and multiple antennas and receiving paths, it is desirable to handle the operating modes and schedule the connections of the multiple SIMs to the networks. One of present solutions for scheduling between multiple SIMs in e.g. a dual-SIM UE, is to share the existing RX chains or paths. In case one SIM is in active mode, i.e. receiving data or voice call, and the other in idle mode, i.e. only occasionally monitoring paging and doing Radio Resource Management (RRM) measurements. When the SIM in idle mode needs to perform idle mode tasks e.g., paging or mobility management, the SIM in active mode needs to interrupt its signaling to allow for the idle mode tasks to be performed. For a paging operation, the interruption is approximately 4-5 subframes due to necessary Automatic Gain Control (AGC) and Automatic Frequency Control (AFC) calibration being performed on subframes preceding the paging subframe. During this time the SIM in active mode is unable to receive any signal at all, including data, control signaling or Hybrid Automatic Repeat Request (HARQ) retransmissions, which results in degraded performance, e.g. interruptions in voice call, data download etc.

SUMMARY

It is therefore an object of embodiments herein to provide an improved schedule scheme for a wireless communication device with multiple SIMs and multiple receiving paths in a wireless communication system.

According to a first aspect of embodiments herein, the object is achieved by a method performed in a wireless communication device for handling operating mode in a wireless communication system. The wireless communication device comprises multiple receiving paths and at least two, a first and second Subscriber Identity Modules, SIMs. A first SIM connection, which is a wireless connection associated to the first SIM, is in active mode towards a first network node. A second SIM connection, which is a wireless connection associated to the second SIM, is in idle mode and camping on a second network node.

The wireless communication device determines a first time instant, a first time duration and a type of idle mode task to be performed by the second SIM connection at the first time instant during the first time duration.

The wireless communication device determines a number of receiving paths needed for the idle mode task to be performed by the second SIM connection.

The wireless communication device reports at a second time instant prior to the first time instant, to the first network node a changed receiving capability of the first SIM connection due to a reduced number of receiving paths available for the first SIM connection.

The wireless communication device allocates a first set of receiving paths to the first SIM connection and a second set of receiving paths to the second SIM connection to perform the idle mode task during the first time duration.

According to a second aspect of embodiments herein, the object is achieved by a wireless communication device for handling operating mode in a wireless communication system. The wireless communication device comprises multiple receiving paths and at least two, a first and second Subscriber Identity Modules, SIMs. A first SIM connection, which is a wireless connection associated to the first SIM, is adapted to be in active mode towards a first network node. A second SIM connection, which is a wireless connection associated to the second SIM, is adapted to be in idle mode and camping on a second network node.

The wireless communication device is configured to determine a first time instant, a first time duration and a type of idle mode task to be performed by the second SIM connection at the first time instant during the first time duration.

The wireless communication device is further configured to determine a number of receiving paths needed for the idle mode task to be performed by the second SIM connection.

The wireless communication device is further configured to report at a second time instant prior to the first time instant, to the first network node a changed receiving capability of the first SIM connection due to a reduced number of receiving paths available for the first SIM connection.

The wireless communication device is further configured to allocate a first set of receiving paths to the first SIM connection and a second set of receiving paths to the second SIM connection to perform the idle mode task during the first time duration.

According to the embodiments herein, two sets of receiving paths are formed in order to perform parallel tasks, in which a first set of receiving paths are located to a first SIM connection to continue to receiving data, whereas a second set of receiving paths are located to a second SIM connection to perform idle tasks of the second SIM e.g., paging or mobility measurements. The scheme according to the embodiments herein allows for parallel active mode and idle mode operations in a wireless communication device with multiple SIMs. This results in increased performance primarily by avoiding active mode interrupts but also secondarily in increased control signalling and HARQ retransmission performance.

Therefore, the embodiments herein provide an improved wireless communication device and method therein for parallel active mode and idle mode operations for all supported SIMs and an optimized management of radio resources in the wireless communication device.

BRIEF DESCRIPTION OF THE DRAWINGS

Examples of embodiments herein are described in more detail with reference to attached drawings in which.

DETAILED DESCRIPTION

Figure 1:
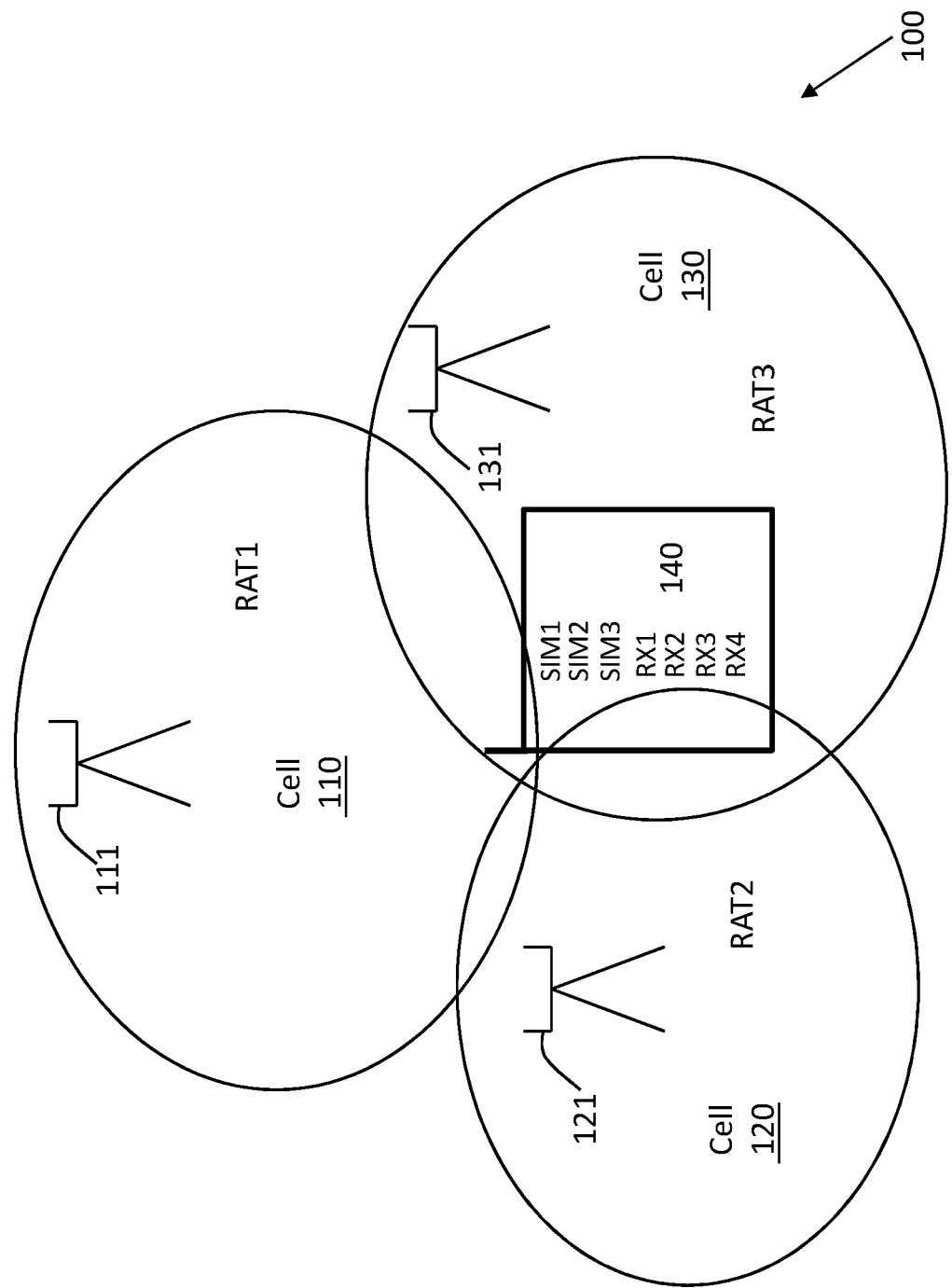
FIG. 1 is a schematic block diagram illustrating embodiments of a wireless communication system.

FIG. 1 depicts an example of a wireless communication system 100 in which embodiments herein may be implemented. The wireless communication system 100 may comprise one or more wireless communication networks such as e.g. any 2G, 3G, 4G or LTE, 5G networks, Wimax, WLAN or WiFi, Bluetooth etc. for providing different RATs.

Each wireless communication network may cover a geographical area which is divided into cells or cover areas. Each cell area is served by a network node operating in the respective wireless communication network. One network node may serve several cells. In FIG. 1, three network nodes are shown, network node 111, network node 121, and network node 131. The term network node as used herein may also be referred to as a serving network node, an access node, an access point or a base station. Therefore the wireless communication system 100 may comprise a number of network nodes serving cells with RATs which may be different, and support communications for a number of wireless communication devices located therein. The network node 111 serves a cell 110 and provides a first RAT, RAT1, the network node 121 serves a cell 120 and provides a second RAT, RAT2, and the network node 131 serves a cell 130 and provides a third RAT, RAT3. The RAT1, RAT2 and RAT3 may be same or different RATs, e.g. LTE, WCDMA/HSPA, GSM or Enhanced Data GSM Evolution (EDGE) etc.

A number of wireless communication devices operate in the wireless communication system 100, whereof one, a wireless communication device 140, is shown in FIG. 1.

The wireless communication device 140 may be, e.g. a mobile terminal or station, a wireless terminal, a user equipment, a mobile phone, a computer such as e.g. a laptop, a Personal Digital Assistants (PDAs) or a tablet computer etc. The wireless communication device 140 comprises at least two SIMs, whereof the wireless communication device 140 shown in FIG. 1 comprises SIM1, SIM2, SIM3. The at least two SIMs may belong to different operators, e.g. which may provide different subscriptions, or provide different RATs or use different spectrum, i.e. different carrier frequencies, in different cover areas or cells, e.g. in cities or countryside. Further, the service subscriptions of the two or more SIMs may differ, such as one SIM may provide an all-exclusive service whereas the other may provide only fundamental past generation service.

The wireless communication device 140 comprises multiple radio receiving paths, whereof the wireless communication device 140 shown in FIG. 1 comprises e.g. four radio receiving paths RX1, RX2, RX3, RX4. A radio receiving path converts received RF signals to baseband signals, and it may comprise e.g. band selective filters, low noise amplifier, mixer, analog to digital converter etc. The wireless communication device 140 may have multiple antennas and capability of MIMO. The multiple radio receiving paths may have its own antenna.

In order to optimally utilize the spectrum, the wireless communication device 140 reports Channel State Information (CSI) to the network node 111, 121, 131 and the network node 111, 121, 131 will base subsequent transmissions on the reported CSI. CSI typically includes a channel quality indicator (CQI) representing certain setups of the modulation and coding scheme (MCS), a precoding matrix indicator (PMI) representing the preferred precoding matrix, and a rank indicator (RI) representing the number of parallel spatial streams that the wireless communication device 140 can resolve. CQI and PMI may be conditioned on a certain rank. Further CQI and RI may be adjusted to a higher value in order to influence link adaption to increase data rates faster following an interrupt.

Figure 2:
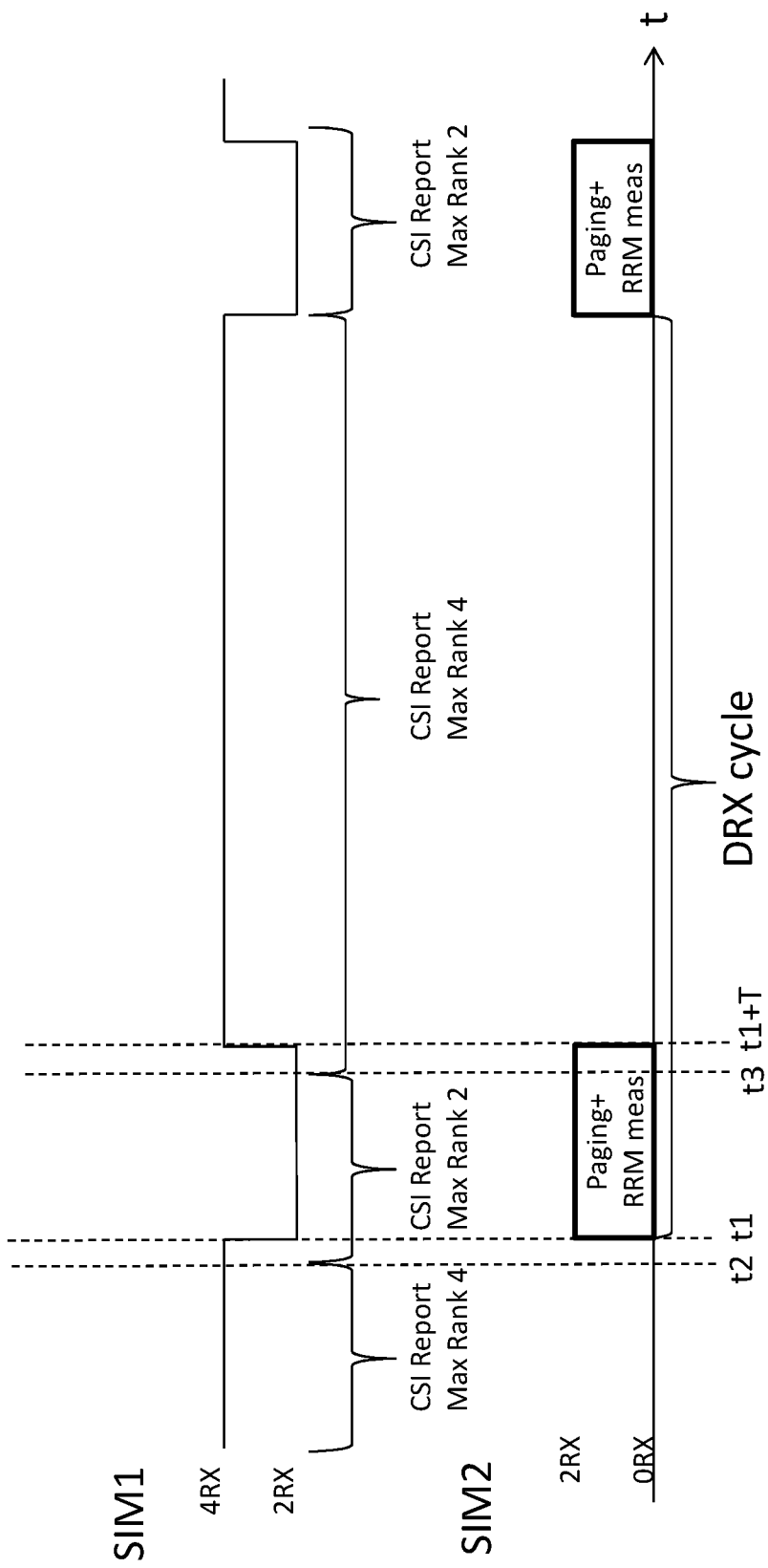
FIG. 2 is a principal sketch illustrating functionality of a wireless communication device according to one embodiment herein.

FIG. 2 is a diagram showing a principal sketch of the functionality in the wireless communication device 140 over time according to some embodiments herein. The wireless communication device 140 has multiple antennas and receiving paths, e.g. 4 receiving paths, 4 RXs, and at least two SIMs, the first SIM, SIM1 associated to a first operator, and is connected to a first network node 111 and operating in active mode. During active mode the wireless communication device 140 at regular intervals reports CSI, i.e. what is possible, with respect to throughput, MCS and number of layers, or Rank in case of MIMO transmissions, to transmit to the wireless communication device 140 in the current radio environment. For example, as shown in FIG. 2, the wireless communication device 140 reports Max Rank 4 in the CSI report when all 4 RXs are available for SIM1 operation, the wireless communication device 140 reports Max Rank 2 in the CSI report when only 2 RXs are available for SIM1 operation. The second SIM, SIM 2 which is associated to a second operator is in idle mode, and only performs idle mode tasks. An idle mode task may be paging reception and/or RRM measurements. Typically the idle mode tasks take 5-10 milliseconds and are performed periodically over a down link receiving cycle, DRX cycle as shown in FIG. 2, e.g. 2.56 seconds. When performing idle mode tasks, the wireless communication device 140 needs to allocate some receiver paths for SIM2 reception.

Figure 3:
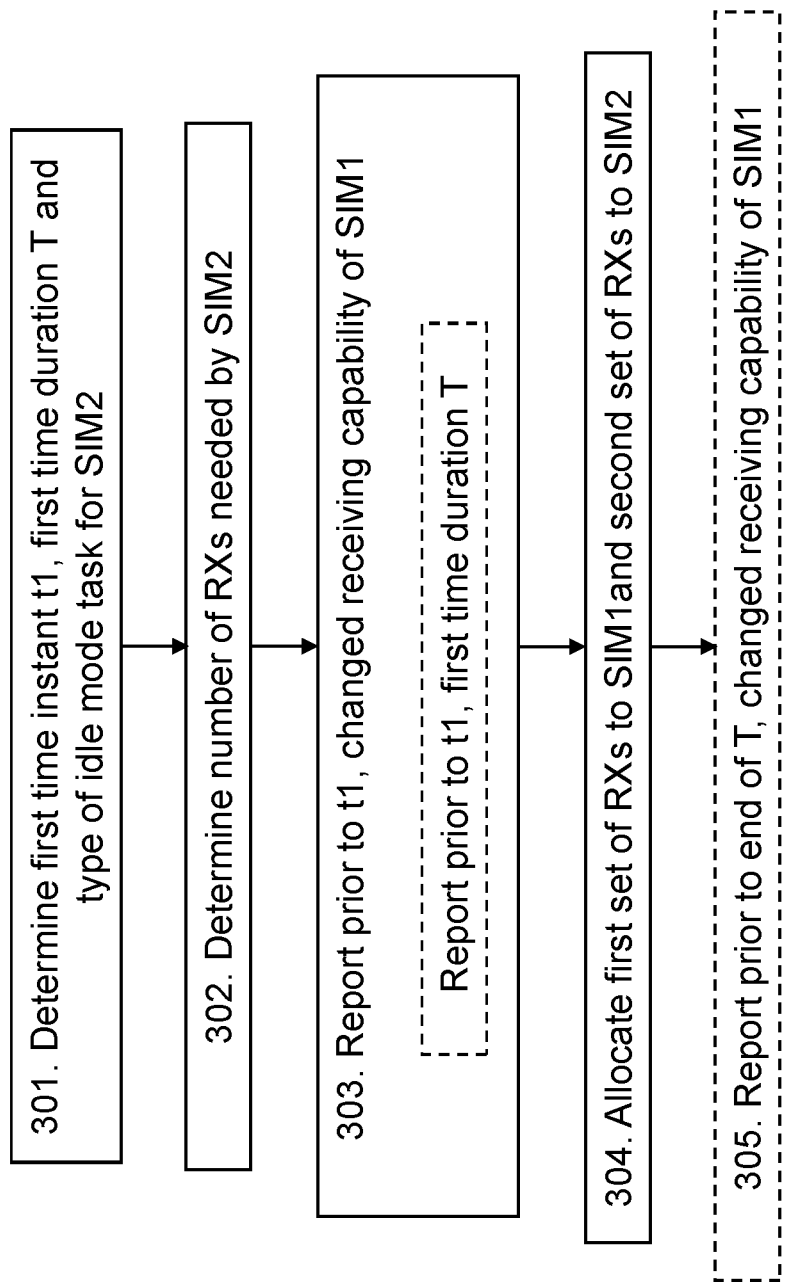
FIG. 3 is a flowchart illustrating embodiments of a method in a wireless communication device.

Example embodiments of a method performed in the wireless communication device 140 for handling operating mode in the wireless communication system 100 will now be described with reference to FIG. 3. The wireless communication device 140 comprises multiple receiving modules RX1, RX2, RX3, RX4 and at least two SIMs, a first and second Subscriber Identity Modules, SIM1 and SIM2. A first SIM connection, which is a wireless connection associated to the first SIM, is in active mode towards the first network node 111. A second SIM connection, which is a wireless connection associated to the second SIM, is in idle mode and camping on the second network node 121. The respective SIM may be associated to different subscriptions or operators, or some SIMs may have subscription associated to the same operator. For example, the first network node 111 may be same as the second network node 121. According to the embodiments herein, the method comprises the following actions, which actions may be taken in any suitable order.

Action 301

In order to know when the second SIM needs to perform idle mode tasks and how long the idle mode tasks will take and what type of the idle mode tasks are, the wireless communication device 140 determines a first time instant t, a first time duration T and a type of idle mode task to be performed by the second SIM connection at the first time instant t1 during the first time duration T. This may be performed by a connection associated to SIM 2 to receive a paging parameter from the second network node 121. The type of the idle mode tasks to perform is typically implementation specific, but may be different depending on received RRM configuration from the camping cell, e.g. cell search, measurements etc. A control unit in the wireless communication device 140 then determines length for the idle mode tasks (t1,T) and the information is reported to a management unit managing SIM1 According to some embodiments herein, the type of idle mode tasks may be one of paging reception, RRM mobility measurements, System Information (SI) acquisition etc. The timing for idle mode task may be expressed as a start time instant, i.e. the first time instant t1, a time duration T and a DRX cycle length when applicable.

Action 302

In order to allocate RXs for the first and second SIM connections, the wireless communication device 140 determines a number of receiving paths RXs, needed for the idle mode task to be performed by the second SIM connection. This may be determined typically by some kind of standard requirements on sufficient paging performance together with information about current radio channel characteristics. Based on that the control unit in the wireless communication device 140 determines e.g. 2 RX paths are needed for paging detection and other idle mode tasks.

Action 303

In order for the network node to adapt the transmission scheduling, the wireless communication device 140 reports at a second time instant t2, prior to the first time instant t1, to the first network node 111 a changed receiving capability of the first SIM connection due to a reduced number of receiving paths available for the first SIM connection.

According to some embodiments herein, the changed receiving capability of the first SIM comprises any of reduced rank, reduced Modulation and Coding Scheme, MCS, reduced sets of aggregated component carriers or reduced numbers of serving cells, etc. For example, a wireless communication device capable of resolving 4 layers with 4 RX chains, may only be able to resolve 2 layers with 2 RX chains. Alternatively, a wireless communication device being able to receive a 64 QAM modulated signal using 4 RX chains, may only be able to resolve a 16 QAM modulated signal with 2 RX chains. Furthermore, a wireless communication device being able to receive 2 CA inter band component carriers using 2 RX chains for each CC, may have to terminate one CC for idle mode operations of SIM 2. The numbers of serving cells for the wireless communication device may also be reduced since some cells may be used for idle mode operations of SIM 2.

According to some embodiments herein, Action 303 may be performed by Channel State Information, CSI, reporting by the wireless communication device 140.

For example, SIM1 is performing CSI reporting at regular intervals to the first network node 111. The CSI may include RANK information with the maximum reported rank conditioned on the number of allocated RX paths to SIM1. It may be assumed that a full rank reporting is performed, i.e., requiring all 4 RX paths. At the second time t2, the wireless communication device 140 starts to report CSI based on only three or two RX paths instead of four. For example a maximum RANK of 3 or 2, i.e. only 2 MIMO layers can be transmitted to the wireless communication device 140 instead of a maximum RANK 4 is reported in the CSI report. This is in order for the network node 111 not to allocate number of MIMO layers more than what the wireless communication device 140 can handle during the time period T. Furthermore, the wireless communication device 140 may also decrease the modulation and coding rate for the reduced layers due to the worsened reception conditions implied by the reduction of received signal energy, that, in turn, is due to the reduced number of receiver paths.

According to some embodiments herein, Action 303 may be performed by a wireless communication device 140 capability reporting.

For example, the wireless communication device 140 may determine that the SIM2 needs some radio receiver paths during the time period T which is allocated to SIM1 for reception. Then these radio paths allocated to SIM1 will be reallocated to SIM2 during this time. The reduced capability of SIM1 will be reported to the first network node 111 by a wireless communication device 140 capability reporting.

According to some embodiments herein, the second time instant t2 is determined based on a response delay of the first network node 111 to the reported changed receiving capability. For example, the time prior to the first time ticorresponds to CSI reporting and scheduling action delay, typically 10-20 ms.

Action 304

The wireless communication device 140 allocates a first set of receiving paths to the first SIM connection and a second set of receiving paths to the second SIM connection to perform the idle mode task during the first time duration T.

According to some embodiments herein, the number of receiving paths needed for the idle mode task of the second SIM connection is determined based on a RAT and radio link conditions associated with the second SIM towards the second network node 121. For example, the number of RX paths that need to be allocated for SIM2 depends on its associated RAT and on the radio conditions. It may be assumed that often 2 RX paths are needed for sufficient performance for paging reception in LTE. Hence during time period (t1, t1+T), the wireless communication device 140 needs to allocate two RX paths to the second SIM connection and two RX paths to the first SIM connection.

During the time period T, SIM2 performs idle mode tasks and SIM1 continues to report reduced maximum rank in the CSI report transmitted to the first network node 111 until a time prior the end of the time period T.

After time period T has expired, SIM1 may again start to transmit CSI reports based on the full set of receive antennas and receiving paths, e.g., it may evaluate and report RANK 4 again, until next idle mode task is needed for SIM 2. Therefore according to some embodiments herein, the wireless communication device 140 may further perform the following action:

Action 305

The wireless communication device 140 reports at a third time instant t3 prior to an end of the first time duration T, to the first network node 111 a changed receiving capability of the first SIM. The third time instant t3 may be determined based on a response delay of the first network node to the reported changed receiving capability.

For example, the wireless communication device 140 identifies how quickly the network node 111 adapts the link connection associated with SIM1 to reported rank information, and adapts its rank indication based on this. For instance, the wireless communication device 140 may identify that it takes 8 subframes from a reported RI increase until the wireless communication device 140 gets scheduled according to the reported rank. The wireless communication device 140 may adapt its reporting typically 8 subframes before the full set of RX paths will again be available to SIM1. That is, it reports the potentially higher rank than what is applicable slightly before the SIM2 idle mode activities terminate. Additionally this behavior may be conditioned on the variability in rank before the SIM2 idle mode activities, and on the duration of the SIM2 idle mode activities. The wireless communication device 140 may also adapt the reporting periodicity of CSI reporting to a shorter period, or transmit an aperiodic CSI report, as per instruction by the eNB, since the periodical CSI reports may occur as rarely as tens of milliseconds, which may result in reduced performance over a prolonged period of time.

The changed receiving capability of the first SIM in this case may comprise any of increased rank, increased Modulation and Coding Scheme, MCS, increased sets of aggregated component carriers or increased numbers of serving cells etc.

According to some embodiments herein, Action 303 may further comprise reporting to the first network node 111 the first time duration T during which the receiving capability of the first SIM connection will be changed. Then it is not necessary for the wireless communication device 140 to perform Action 305. The network node 111 knows that after the time period T has expired, SIM1 again will have the full set of receive antennas and receiving paths, e.g., it may have RANK 4 capability again, until next idle mode task is needed for SIM2.

To summarize, the method according to embodiments herein is capable of handling parallel active and idle mode operations in the wireless communication device 140 with multi-RX multi-SIM, in which at least one SIM is in active mode and one SIM is in idle mode. The active mode operations may be e.g., data signaling and the idle mode operations may be e.g., paging or mobility measurements. By communicating with the network node, e.g., through a Channel State Information (CSI) report, capability report or some other report, the wireless communication device 140 reports a reduced active mode capability, e.g., by only being able to receive fewer parallel streams and/or a lower modulation and coding scheme for said streams. Following the CSI report, the wireless communication device 140 allocates a first subset of RX paths for continued active mode operations and a second subset of RX paths for idle mode operations that may then be carried out. Following the performed idle mode operation, the wireless communication device 140 may reallocate the second subset RX paths to the active mode operations so that they can use the full set of RX paths again. In this way, the wireless communication device 140 achieves an increased performance by avoiding active mode interrupts and optimized management of radio resources for multi-SIM operations.

Figure 4:
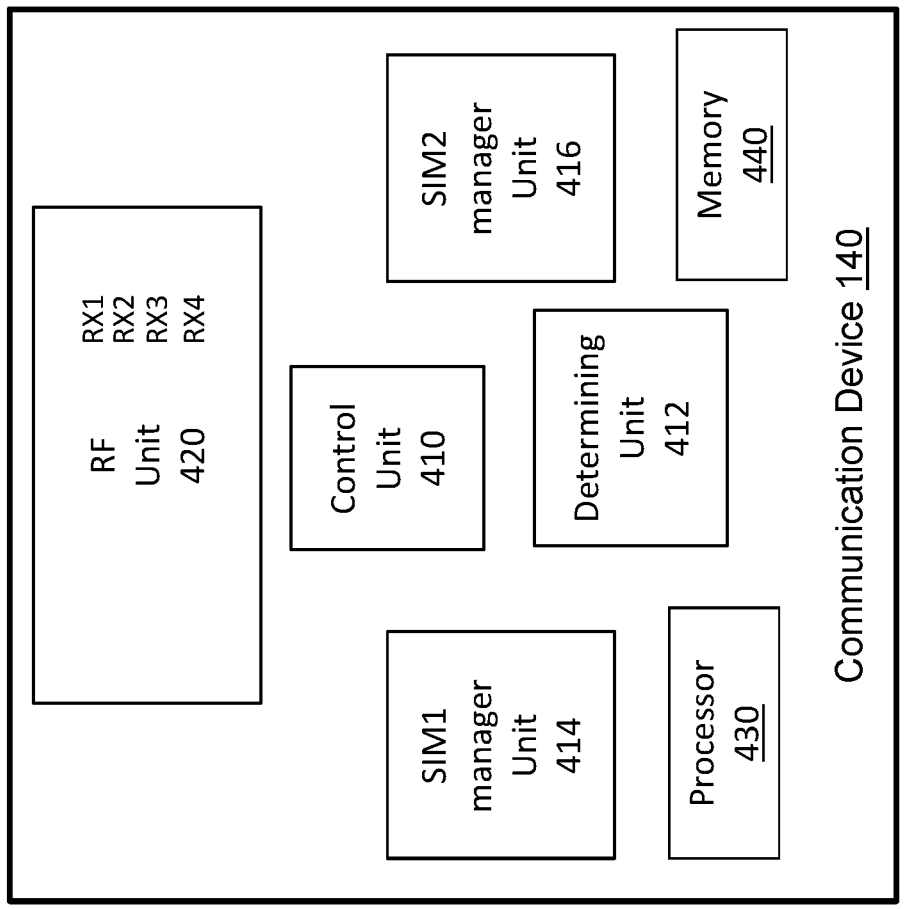
FIG. 4 is a schematic block diagram illustrating a wireless communication device according to embodiments herein.

To perform the method actions in the wireless communication device 140 for handling operating mode in the wireless communication system 100 as described above in relation to FIG. 3, the wireless communication device 140 comprises the following circuits, units or modules depicted in FIG. 4. As mentioned above, the wireless communication system 100 comprises any one or more 2G, 3G, 4G or LTE, 5G networks, Wimax, WLAN or WiFi etc. The wireless communication device 140 comprises multiple receiving paths and at least two Subscriber Identity Modules, SIMs. The first SIM connection, which is a wireless connection associated to the first SIM, is in active mode towards a first network node, the second SIM connection, which is a wireless connection associated to the second SIM, is in idle mode and camping on a second network node.

The wireless communication device 140 may comprise, e.g. a control unit 410, a determining unit 412, a RF unit 420, a SIM1 manager unit 414, a SIM2 manager unit 416, etc. The RF unit 420 may represent any radio resources or radio interfaces, e.g. radio receivers or transmitters etc. for receiving and transmitting radio signals from/to network nodes. The RF unit 420 comprises multiple receiving paths RX1, RX2, RX3, RX4 as shown in FIG. 4.

According to the embodiments herein, the communication device 140 is configured to, e.g. by means of the determining unit 412 being configured to, determine a first time instant t1, a first time duration T and a type of idle mode task to be performed by the second SIM connection at the first time instant t1 during the first time duration T. The communication device 140 is further configured to determine a number of receiving paths needed for the idle mode task to be performed by the second SIM connection.

According to the embodiments herein, the communication device 140 is configured to, e.g. by means of the SIM1 manager unit 414 being configured to, report at a second time instant prior to the first time instant, to the first network node a changed receiving capability of the first SIM connection due to a reduced number of receiving paths available for the first SIM connection. The communication device 140 is further configured to, e.g. by means of the control unit 412 being configured to, allocate a first set of receiving paths to the first SIM connection and a second set of receiving paths to the second SIM connection to perform the idle mode task during the first time duration.

According to some embodiments herein, the wireless communication device 140 may be configured to report at a second time instant prior to the first time instant, to the first network node the first time duration during which the receiving capability of the first SIM connection will be changed.

According to some embodiments herein, the wireless communication device 140 may be configured to report at a third time instant prior to an end of the first time duration, to the first network node a changed receiving capability of the first SIM.

According to some embodiments herein, the type of idle mode task may comprise any of paging monitoring, mobility measurements, system information acquisition.

According to some embodiments herein, the wireless communication device may be configured to report the changed receiving capability of the first SIM connection by a Channel State Information (CSI) reporting or by a wireless communication device 140 capability reporting.

According to some embodiments herein, the changed receiving capability of the first SIM may comprise any of changed (reduced or increased) rank, changed (reduced or increased) Modulation and Coding Scheme, MCS, changed (reduced or increased sets of aggregated component carriers or changed (reduced or increased) numbers of serving cells, or changed frequency band.

According to some embodiments herein, the number of receiving paths needed for the idle mode task of the second SIM connection may be determined based on a RAT and radio link conditions associated with the second SIM towards the second network node.

According to some embodiments herein, the second time instant, the third time instant may be determined based on a response delay of the first network node to the reported changed receiving capability.

Those skilled in the art will appreciate that the control unit 410, the determining unit 412, the SIM1 manager unit 414 and SIM2 manager unit 416 described above may be referred to one unit, a combination of analog and digital circuits, one or more processors, such as processor 430, depicted in FIG. 4, configured with software and/or firmware and/or any other digital hardware performing the function of each unit. One or more of these processors, the combination of analog and digital circuits as well as the other digital hardware, may be included in a single application-specific integrated circuitry (ASIC), or several processors and various analog/digital hardware may be distributed among several separate components, whether individually packaged or assembled into a system-on-a-chip (SoC).

The wireless communication device 140 may further comprise a memory 440 comprising one or more memory units. The memory 440 is arranged to be used to store information, e.g. CSI, CQI, RI and data, as well as configurations to perform the methods herein when being executed in the communication device 140.

The embodiments herein in the wireless communication device 140 for handling operating mode in the wireless communication system 10, may be implemented through one or more processors, such as the processor 430 in the wireless communication device 140 together with computer program code for performing the functions and actions of the embodiments herein. The program code mentioned above may also be provided as a computer program product, for instance in the form of a data carrier carrying computer program code for performing the embodiments herein when being loaded into the wireless communication device 140. One such carrier may be in the form of a CD ROM disc. It is however feasible with other data carriers such as a memory stick. The computer program code may furthermore be provided as pure program code on a server and downloaded to the wireless communication device 140.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method performed in a wireless communication device for handling operating mode in a wireless communication system, wherein the wireless communication device comprises multiple receiving paths and at least two Subscriber Identity Modules, SIMs, the method comprising:
    when a first SIM connection, which is a wireless connection associated to a first SIM, is in active mode towards a first network node, and a second SIM connection, which is a wireless connection associated to a second SIM, is in idle mode and camping on a second network node, performing:
    determining a type of idle mode task to be performed by the second SIM connection starting at a future first time instant and continuing during a first time duration;
    determining a number of receiving paths needed for the idle mode task to be performed by the second SIM connection;
    reporting at a second time instant prior to the first time instant, to the first network node a changed receiving capability of the first SIM connection due to a reduced number of receiving paths being available for the first SIM connection while the second SIM connection performs the idle mode task;
    allocating a first set of receiving paths to the first SIM connection for use during the first time duration and allocating a second set of receiving paths to the second SIM connection to perform the idle mode task during the first time duration.

2. The method according to claim 1, further comprising reporting at the second time instant prior to the first time instant, to the first network node the first time duration during which the receiving capability of the first SIM connection will be changed.

3. The method according to claim 1, further comprising:
    reporting at a third time instant prior to an end of the first time duration, to the first network node, a changed receiving capability of the first SIM, wherein the changed receiving capability corresponds to a receiving capability of the first SIM following completion of the first time duration.

4. The method according to claim 1, wherein the type of idle mode task comprises any of paging monitoring, mobility measurements, system information acquisition.

5. The method according to claim 1, wherein reporting at a second time instant prior to the first time instant, to the first network node is performed by a Channel State Information, CSI, reporting.

6. The method according to claim 1, wherein reporting at a second time instant prior to the first time instant, to the first network node is performed by a wireless communication device capability reporting.

7. The method according to claim 1, wherein the changed receiving capability of the first SIM comprises any of changed rank, changed Modulation and Coding Scheme, MCS, changed sets of aggregated component carriers or changed numbers of serving cells.

8. The method according to claim 1, wherein the number of receiving paths needed for the idle mode task of the second SIM connection is determined based on a Radio Access Technology, RAT, and radio link conditions associated with the second SIM towards the second network node.

9. The method according to claim 1, wherein the second time instant is determined based on a response delay of the first network node to the reported changed receiving capability.

10. The method according to claim 3, wherein the third time instant is determined based on a response delay of the first network node to the reported changed receiving capability.

11. The method according to claim 1, wherein the first network node is same as the second network node.

12. A wireless communication device for handling operating mode in a wireless communication system, wherein the wireless communication device comprises:
    a controller;
    multiple receiving paths; and
    at least two Subscriber Identity Modules, SIMs,
    wherein, when a first SIM connection, which is a wireless connection associated to a first SIM, is in active mode towards a first network node, and a second SIM connection, which is a wireless connection associated to a second SIM, is in idle mode and camping on a second network node, the controller causes the wireless communication device is configured to:
    determine a type of idle mode task to be performed by the second SIM connection starting at a future first time instant and continuing during a first time duration;
    determine a number of receiving paths needed for the idle mode task to be performed by the second SIM connection;
    report at a second time instant prior to the first time instant, to the first network node a changed receiving capability of the first SIM connection due to a reduced number of receiving paths being available for the first SIM connection while the second SIM connection performs the idle mode task;
    allocate a first set of receiving paths to the first SIM connection for use during the first time duration and allocate a second set of receiving paths to the second SIM connection to perform the idle mode task during the first time duration.

13. The wireless communication device according to claim 12, is further configured to report at the second time instant prior to the first time instant, to the first network node the first time duration during which the receiving capability of the first SIM connection will be changed.

14. The wireless communication device according to claim 12, is further configured to report at a third time instant prior to an end of the first time duration, to the first network node, a changed receiving capability of the first SIM, wherein the changed receiving capability corresponds to a receiving capability of the first SIM following completion of the first time duration.

15. The wireless communication device according to claim 12, wherein the type of idle mode task comprises any of paging monitoring, mobility measurements, system information acquisition.

16. The wireless communication device according to claim 12, wherein the wireless communication device is configured to report the changed receiving capability of the first SIM connection by a Channel State Information, CSI, reporting.

17. The wireless communication device according to claim 12, wherein the wireless communication device is configured to report the changed receiving capability of the first SIM connection by a wireless communication device capability reporting.

18. The wireless communication device according to claim 12, wherein the changed receiving capability of the first SIM comprises any of changed rank, changed Modulation and Coding Scheme, MCS, changed sets of aggregated component carriers or changed numbers of serving cells.

19. The wireless communication device according to claim 12, wherein the number of receiving paths needed for the idle mode task of the second SIM connection is determined based on a Radio Access Technology, RAT, and radio link conditions associated with the second SIM towards the second network node.

20. The wireless communication device according to claim 12, wherein the second time instant is determined based on a response delay of the first network node to the reported changed receiving capability.

21. The wireless communication device according to claim 12, wherein the third time instant is determined based on a response delay of the first network node to the reported changed receiving capability.

22. The wireless communication device according to claim 12, wherein the first network node is same as the second network node.

\* \* \* \* \*